May 17, 1949.    G. LE WITT    2,470,708
MOTORIZED PRESSURE JUICE EXTRACTOR
Filed March 11, 1947    3 Sheets-Sheet 1
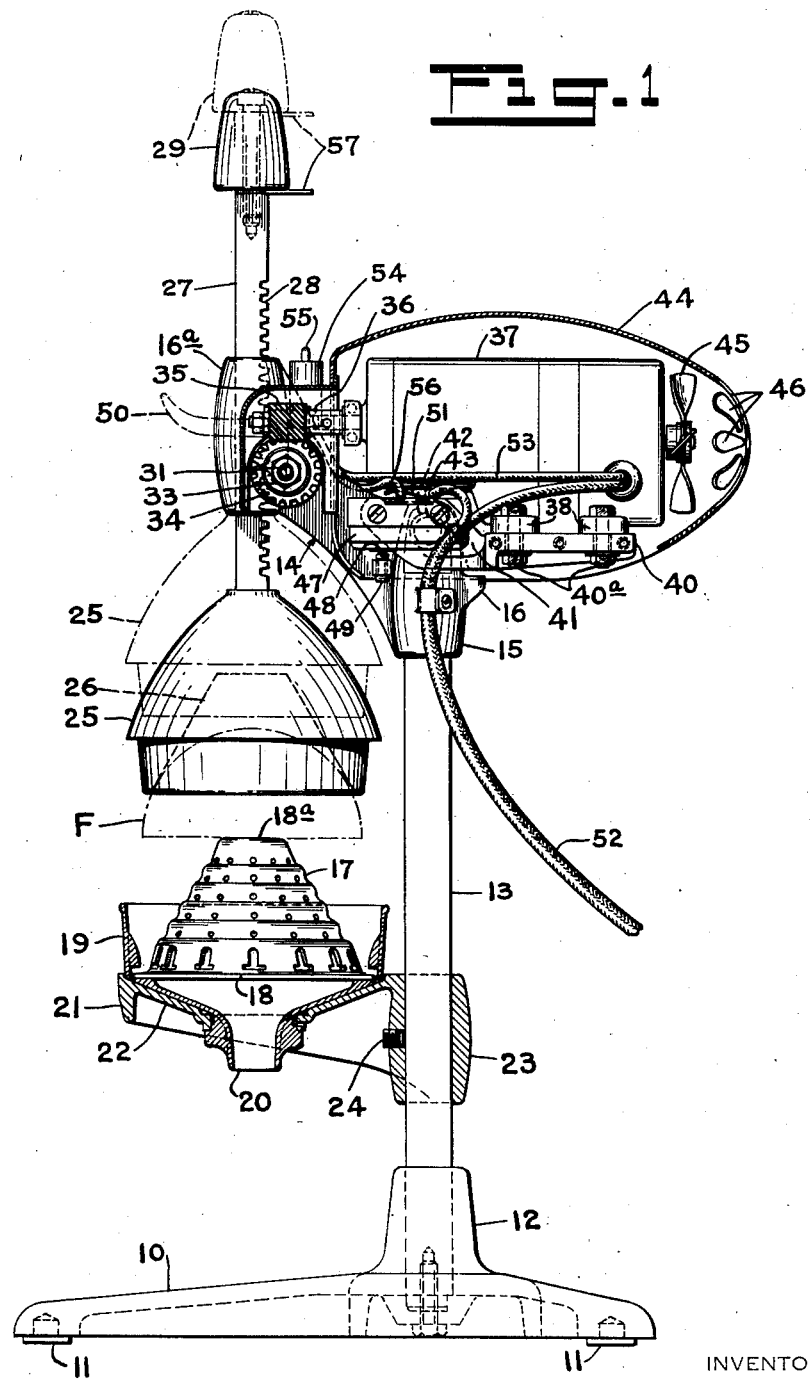
INVENTOR
GEORGE LeWITT
BY H. G. Manning
ATTORNEY May 17, 1949.　　　G. LE WITT　　　2,470,708
MOTORIZED PRESSURE JUICE EXTRACTOR
Filed March 11, 1947　　　　　　　　　3 Sheets-Sheet 2
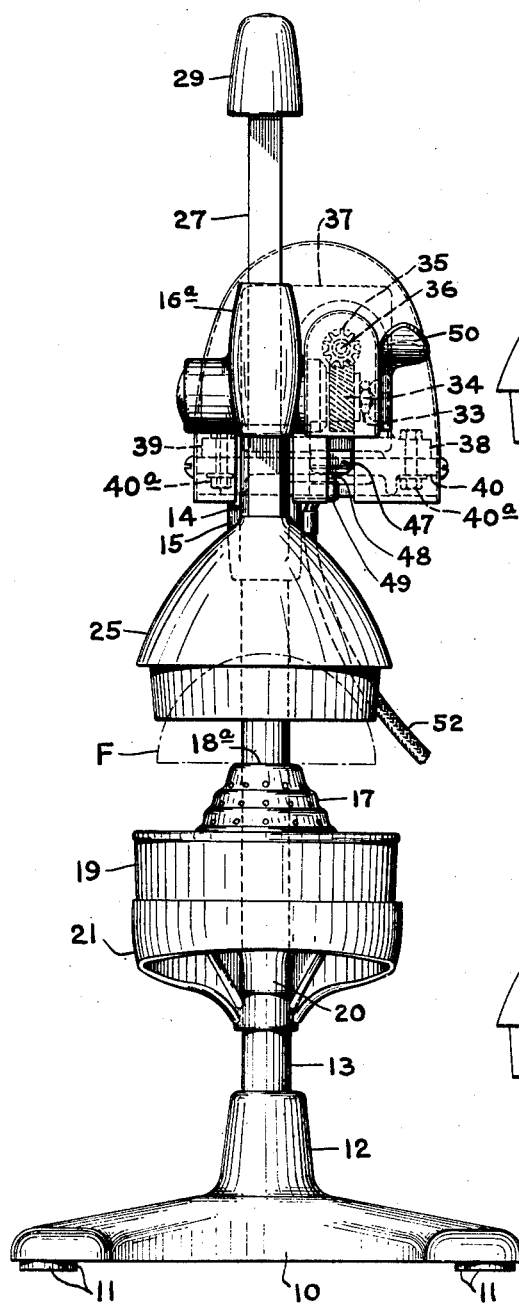
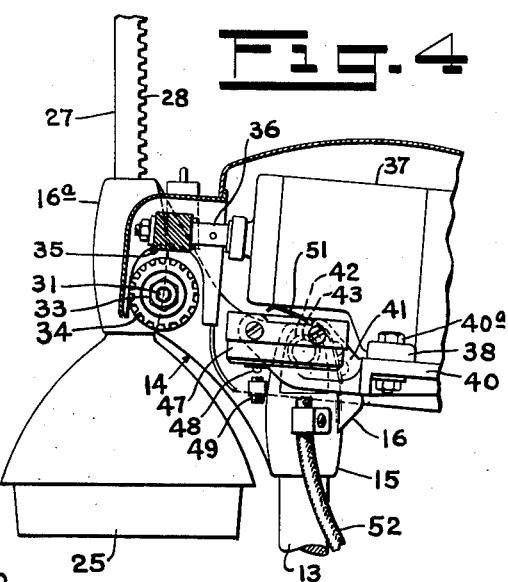
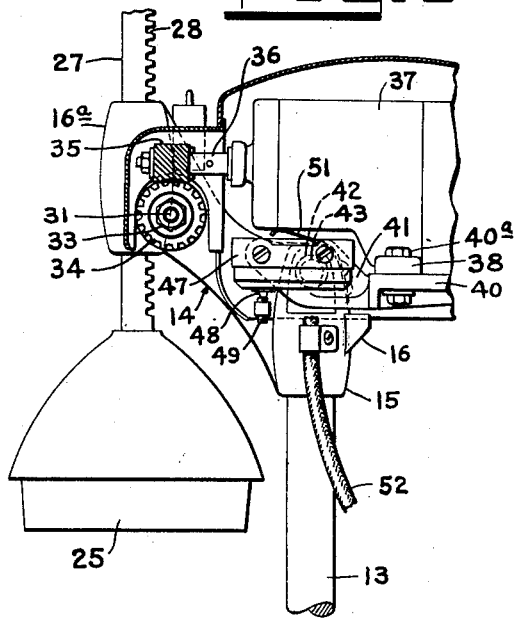
INVENTOR
GEORGE LEWITT
BY H. G. Manning
ATTORNEY May 17, 1949.　　　　G. LE WITT　　　　2,470,708
MOTORIZED PRESSURE JUICE EXTRACTOR
Filed March 11, 1947　　　　　　　　　　　　3 Sheets-Sheet 3
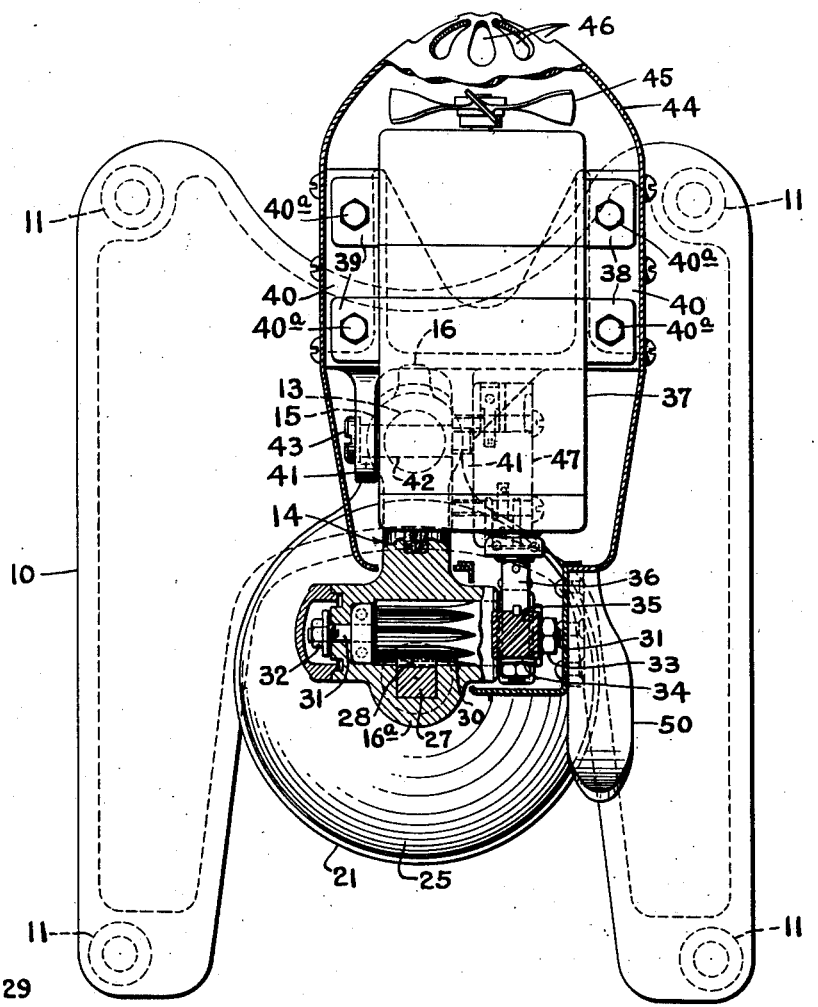
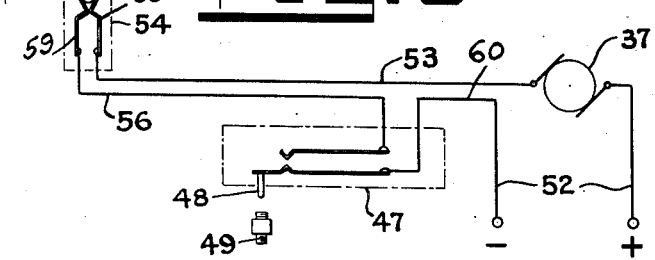
INVENTOR
GEORGE LeWITT
BY H. G. Manning
ATTORNEY Patented May 17, 1949

2,470,708

UNITED STATES PATENT OFFICE 2,470,708

MOTORIZED PRESSURE JUICE EXTRACTOR

George Le Witt, New Britain, Conn.

Application March 11, 1947, Serial No. 733,737

6 Claims. (Cl. 100—42)

This invention relates to juice extraction and more particularly to a motor-operated extractor for the juice of a citrus fruit.

One object of the invention is to provide a device of the above nature, of the rack and gear type, which may be manually-controlled so as to mechanically advance the extracting head against the citrus fruit section, without rotation, until fully crushed, and in which said head will be disengaged automatically therefrom, when the handle is released.

A further object is to provide an apparatus of the above nature in which the lower fixed cone is readily adjustable to receive various sizes of citrus fruit, and in which the upper extractor head will continue its downward crushing motion under the operation of the motor and gear reduction unit until the control handle is released, or until a circuit breaker is operated.

A further object is to provide a device of the above nature which will be simple in construction, inexpensive to manufacture, easy to install and manipulate, compact, ornamental in appearance, and very efficient and durable in use.

With these and other objects in view, there has been illustrated in the accompanying drawings one form in which the invention may conveniently be embodied in practice.

In the drawings,

Fig. 1 represents a side view of the improved fruit juice extractor.

Fig. 2 is a front view of the same, as it appears at the start of the extracting operation with the motor in horizontal position, and with the switch closed.

Fig. 3 is a top plan view of the same.

Fig. 4 is a view of the upper part of the apparatus as it appears with the motor tilted out of operating position and with the switch open and the rack-operating worm out of mesh with its worm wheel.

Fig. 5 is a similar view of the upper part of the apparatus, with the motor switch closed, and with the worm and worm wheel in mesh with each other.

Fig. 6 is a diagrammatic view of the electrical circuits of the apparatus.

Referring now to the drawings, in which like reference numerals denote corresponding parts throughout the several views, the numeral 10 indicates a horizontal U-shaped base having four rubber feet 11 at the corners thereof, and provided with an upstanding neck 12 and a vertical upstanding supporting post 13.

At the top of the post 13, provision is made of an inclined side bracket 14 having a depending bottom hub 15 fitted over the top of said post 13—said hub 15 having a side horizontal stop seat 16 for a purpose to be hereinafter described.

The side bracket 14 is also provided at its upper end with an upstanding rack-enclosing hub 16a having a square aperture for loosely embracing a vertical rack rod 27 having rack teeth 28 on one side thereof.

The fruit section F from which the juice is to be extracted is adapted to be placed on a stationary bottom ribbed perforated extractor cone 17, having a peripheral base flange 18, and a flat top 18a, as clearly shown in Fig. 1.

The bottom cone 17 is adapted to be embraced at its lower portion by an annular juice receiver 19, having an inclined bottom funnel spout 20, said funnel spout being supported by an adjustable bracket 21, having a conical section 22, fitted about the spout 20, and a rear integral collar 23 which may be secured to the post 13 at any desired height by means of a set screw 24.

The fruit section F is adapted to be placed upon the lower cone 17 and crushed for extracting the juice therefrom by means of a hollow upper extractor head 25 provided with a frusto-conical inner section 26. The top of the head 25 is secured to the lower end of the vertical rack rod 27, which has a top handle knob 29 for convenience in raising the head 25 from the fruit section F after the extracting operation has been completed.

In order to drive the upper extracting head 25 downwardly mechanically, provision is made of a horizontal rack-engaging idler pinion 30, mounted upon a rotatable shaft 31, secured to the bracket 14 by a pair of end nuts 32, 33. The shaft 31 also carries a worm gear 34 adapted to be driven by a worm 35 mounted above it upon a shaft 36 of a motor and gear reducer unit 37—the latter having two pairs of bottom ears 38, 39, which are detachably secured to a motor-support base 40, as by means of four locking bolts 40a.

The motor unit base 40 has a forward pivot section 41 provided with a horizontal aperture 42 for pivotally receiving a pin 43 about which the motor may be swung on a horizontal axis from the inactive position shown in Fig. 4 to the operating position shown in Fig. 1.

The motor 37 is encased by an oval housing 44 which encloses a cooling fan 45 located at the rear of said motor for drawing air inwardly through a group of ventilating openings 46 in the rear of said housing 44.

The motor unit base 40 also carries a microswitch 47 having a depending movable contact 48, which is adapted to be engaged by an adjustable lug 49 mounted on the side bracket 14.

In order to permit the motor to be manually tilted about its pivot pin 43, provision is made on the housing 44, of an elongated substantially horizontal spoon-shaped handle 50, as clearly shown in Figs. 2 and 3 of the drawings.

Provision is also made of a leaf spring 51 connected to the socket 15 and engaging the bottom of the motor and gear unit 37—said spring 51 serving to urge the motor unit into the tilted inactive position shown in Fig. 4 whenever the handle 50 is released.

Provision is also made of a two-conductor electrical cord 52 for supplying energy to the motor, and a single-conductor cord 53 for connecting the motor to a circuit breaker 54 which serves to automatically break the circuit through the motor and gear reducer unit 37, when the extractor head 25 has moved downwardly to a predetermined point, as a safety measure and insure against overloading of the motor.

The circuit breaker 54 includes a movable insulation plunger 55 which is adapted to be depressed when engaged by a side arm 57 carried by the lower end of the hand knob 29. This action will spread apart a pair of resilient contacts 58, 59 and open the motor circuit automatically. A conductor cord 56 connects the terminal 59 of the circuit breaker 54 to the microswitch 47. A similar single conductor cord 60 is provided for connecting said microswitch 47 to the cord 52.

Operation

In operation, when it is desired to extract the juice from a citrus fruit, a fruit section F will be placed manually on the top of the fixed bottom cone 17, and the extractor head 25 allowed to drop by gravity thereon under the control of the handle knob 29.

The handle 50 of the motor casing will then be manually depressed and held down against the action of the spring 51, causing the worm 35 to mesh with the worm gear 34 and at the same time the lug 49 will close the motor switch 47 and start the rotation of the horizontal worm 35.

This will cause the rotation of the pinion 30 and worm gear 34 and force the rack rod 27 to move downwardly until the upper hollow head 25 of the squeezer crushes the fruit section against the fixed lower cone 17 crushing it and extracting the juice therefrom. The downward motion of the head 25 will continue until the operator releases his hold on the handle 50, whereupon the leaf spring 51 will cause the motor to tilt to the position of Fig. 4 and the worm gear 34 to be disengaged from the worm 35.

The motor circuit will also be broken whenever the arm 57 engages the plunger 55 of the circuit breaker 54.

The juice extracted from the fruit will pass through the funnel spout 20 to a suitable container, not shown, located beneath the receiver 19. The extractor head 25 and the rack rod 27 may then be manually raised sufficiently to release the fruit section F from which the juice has been extracted. Another half fruit section F may then be placed upon the lower cone 17, and the upper extractor head 25 will be allowed to drop by gravity thereupon and extracted as before.

While there has been disclosed in this specification one form in which the invention may be embodied, it is to be understood that this form is to be shown for the purpose of illustration only, and that the invention is not to be limited to a specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a juice extractor, a supporting post having an upper side bracket, said bracket having a side hub, a rack mounted to move up and down within said hub, an idle pinion mounted on said bracket and engaging said rack, a shaft mounting said idle pinion and having a worm gear thereon, a gear reduction motor unit tiltably mounted on said bracket, and carrying a worm on the motor shaft, said worm being caused to engage said worm gear when said motor unit is tilted in one direction, a stop on said bracket engaged by the base of said motor unit to support said motor unit when tilted out of use, a base cone secured to said post, and a movable hollow juice extractor head secured to the lower end of said rack.

2. The invention defined in claim 1, in which spring means are provided to normally hold said worm out of mesh with said worm gear, when the extractor is out of use.

3. The invention defined in claim 1, in which said motor is mounted on a horizontal axis in said bracket.

4. The invention defined in claim 1, in which said motor and gear reduction unit is surrounded by a housing having a manually-operable handle to depress said worm into mesh with the worm gear.

5. The invention as defined in claim 1, in which a switch is provided on the motor unit base, said switch having a projecting contact, and a lug on said bracket in alignment with said contact to close the switch when the motor unit is swung about its pivotal axis whereby the extractor head will be driven downwardly to crush the fruit section against said lower cone.

6. The invention defined in claim 1, in which provision is made of a circuit breaker to open the motor circuit whenever said extractor head moves downwardly to a predetermined point.

GEORGE LE WITT.

REFERENCES CITED

The following references are of record in the file of this patent:

UNITED STATES PATENTS

| Number | Name | Date |
| --- | --- | --- |
| 1,958,570 | Flegel | May 15, 1934 |
| 2,183,804 | Bloomfield | Dec. 19, 1939 |
| 2,326,996 | Fuge | Aug. 17, 1943 |
| 2,330,860 | Behar | Oct. 5, 1943 |
| 2,372,862 | Strauss | Apr. 3, 1945 |